Sept. 25, 1962  C. F. DIETRICH  3,055,259
OPTICAL MEASURING DEVICES
Filed March 3, 1958  4 Sheets-Sheet 1

Inventor
Cornelius Frank Dietrich
By
Watson, Cole, Grindle & Watson
(Attorneys)

Sept. 25, 1962 C. F. DIETRICH 3,055,259
OPTICAL MEASURING DEVICES

Filed March 3, 1958 4 Sheets-Sheet 4

Inventor
Cornelius Frank Dietrich
By
Watson, Cole, Grindle & Watson
(Attorneys)

United States Patent Office 3,055,259
Patented Sept. 25, 1962

3,055,259
OPTICAL MEASURING DEVICES
Cornelius Frank Dietrich, Maidenhead, England, assignor to Optical Measuring Tools Limited, Maidenhead, England, a British company
Filed Mar. 3, 1958, Ser. No. 718,649
7 Claims. (Cl. 88—14)

This invention comprises improvements in or relating to optical measuring devices, including depth-locators and instruments for measuring the focal length of lenses and collimators.

It is an object of the present invention to provide a measuring device which does not make contact with the object. It is known for this purpose to use optical depth-locators which consist of a microscope mounted on slideways, the difference in position of the microscope after having been focused on two location faces giving the difference in position of these two faces with an accuracy which is limited by the front focal range or depth of focus of the microscope. In a microscope comprising an objective of focal length ⅓″ and an eyepiece of focal length 1″, the total depth of focus may be of the order of half of a thousandth of an inch, if the numerical aperture of the objective is about 0.5. The depth of focus is made up of two terms, a contribution from the objective, and a contribution from the eyepiece, the latter term being caused by the large accommodation of the eye. That is to say, the accuracy obtained by this method is not greater than about five ten-thousandths of an inch which for many purposes is not sufficient. If an objective of shorter focal length is used in order to obtain a higher numerical aperture, thereby reducing the depth of focus, the front focal distance will be greatly reduced, and the utility of the locating method is thereby limited.

Instead of using such a device as a depth-locator it is possible if the objective is made removable to determine the focal length of any objective, and the apparatus according to the present invention can be used in either connection, that is to say, either as a depth-locator or as a means for determining focal lengths. According to the invention an optical device for determining focal distance comprises in combination a lens-holding device, means for holding an object in the optical axis of a lens held in the lens-holding device, means for adjusting the focal setting of the lens-holding device and the object relatively to one another, an optical system on the other side of the lens-holding device from the object comprising two separated elements for picking up two distinct beams passing through separated portions of a lens held in the lens-holding means, bringing the two beams together and focusing them to form two images which are superposed at a particular focal setting an eyepiece to view the images, and means to determine the setting of the lens-holding device relatively to the object-holding device.

The separated elements for picking up the two distinct beams may comprise a mirror to pick up the first beam and reflect it transversely to the optical axis and, spaced from the mirror in the direction in which the first beam is reflected, a prism with a half-silvered face to catch and reflect the first beam and also to pass on the second beam received from the lens, in superposed relation to the first beam.

Furthermore, according to the present invention, an optical depth-locating device comprises an objective, means for adjusting the focal setting thereof, a screen or equivalent permitting light from an object passing through two separated portions of the objective near its periphery to proceed as two distinct beams, an optical system behind the objective for bringing the two beams together and focusing them to form two images which are superposed at a particular focal setting, an eyepiece to view the images, a focal setting datum and means to measure the distance of the setting from the datum.

This device is in principle something like a range-finder but as a single objective is used the difficulty which would arise in making a range-finder with two objectives close together of the tiny dimensions which would be required, is obviated.

The optical system for bringing the two beams together may comprise reflecting means to bring the beams into proximity and a lens through which they both pass and which shortens the distance to the images formed by them. The reflecting means may comprise a prism extending across from beam to beam and having an inclined internal face in the path of one beam, a second parallel or nearly parallel face in the path of the second beam and means to cause the second beam to pass through the second face while the first beam is reflected thereby.

The invention may be used with any type of microscope objective, but may be conveniently used in conjunction with an objective which comprises a thick concavo-convex lens set with its concave side toward the object to be viewed and silvered at its rear edges and its front centre. Such an objective, which is known per se, may be placed at a greater distance from the object to be viewed (that is to say the surface to be located) than a plain transparent lens objective, which is an advantage in a depth-locator. Objectives of the type described above can have a working distance up to nearly double the focal length of the objective.

The following is a description by way of example of one specific construction in accordance with the invention:

In the accompanying drawings.

Figure 1:
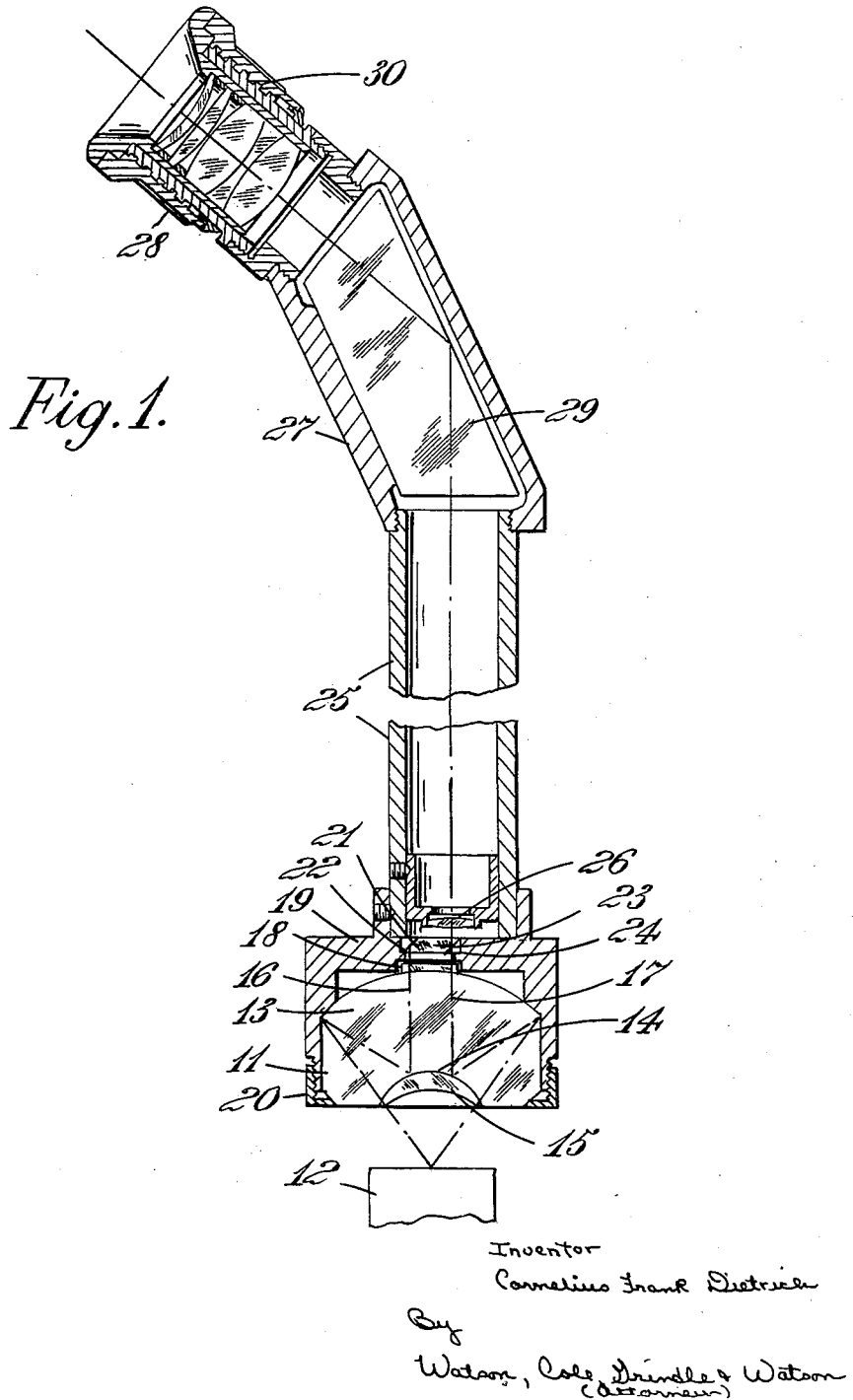
FIGURE 1 is a longitudinal section through the essential optical parts of the apparatus.
Figure 2:
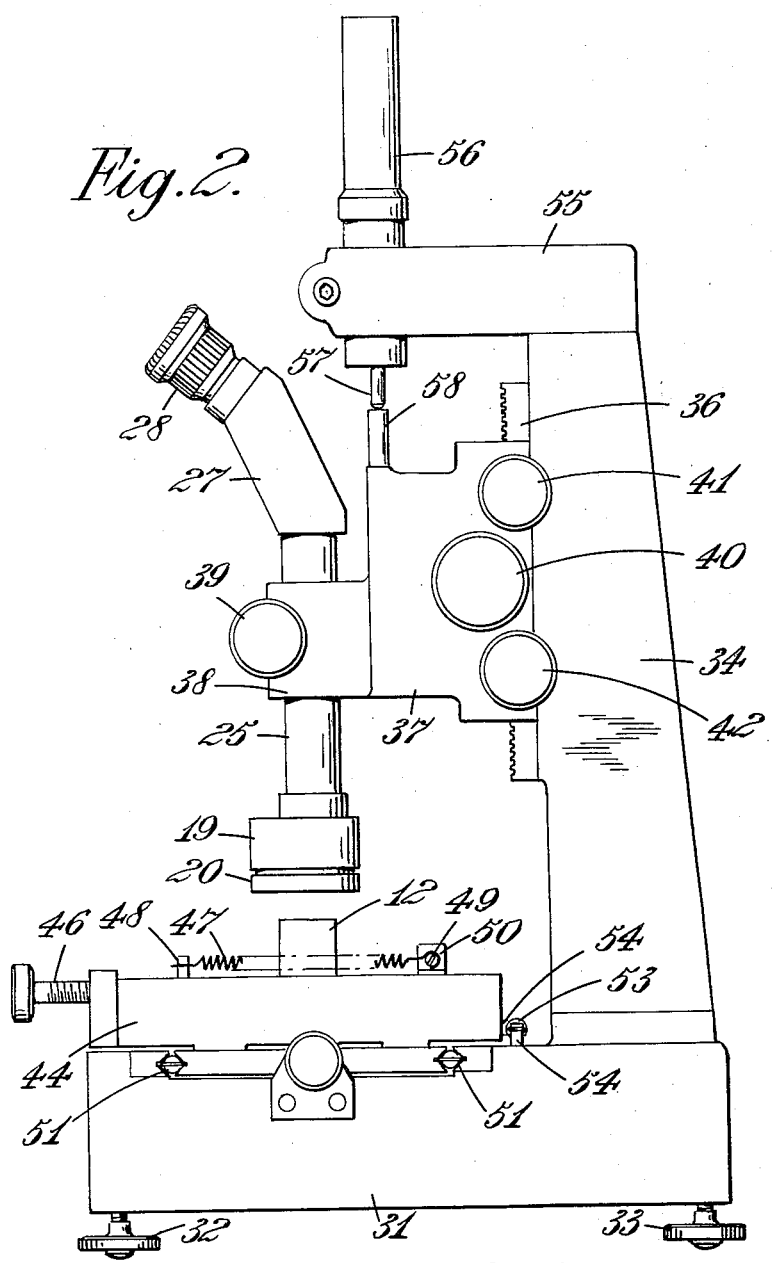
FIGURE 2 is a side elevation of the apparatus as a whole.
Figure 3:
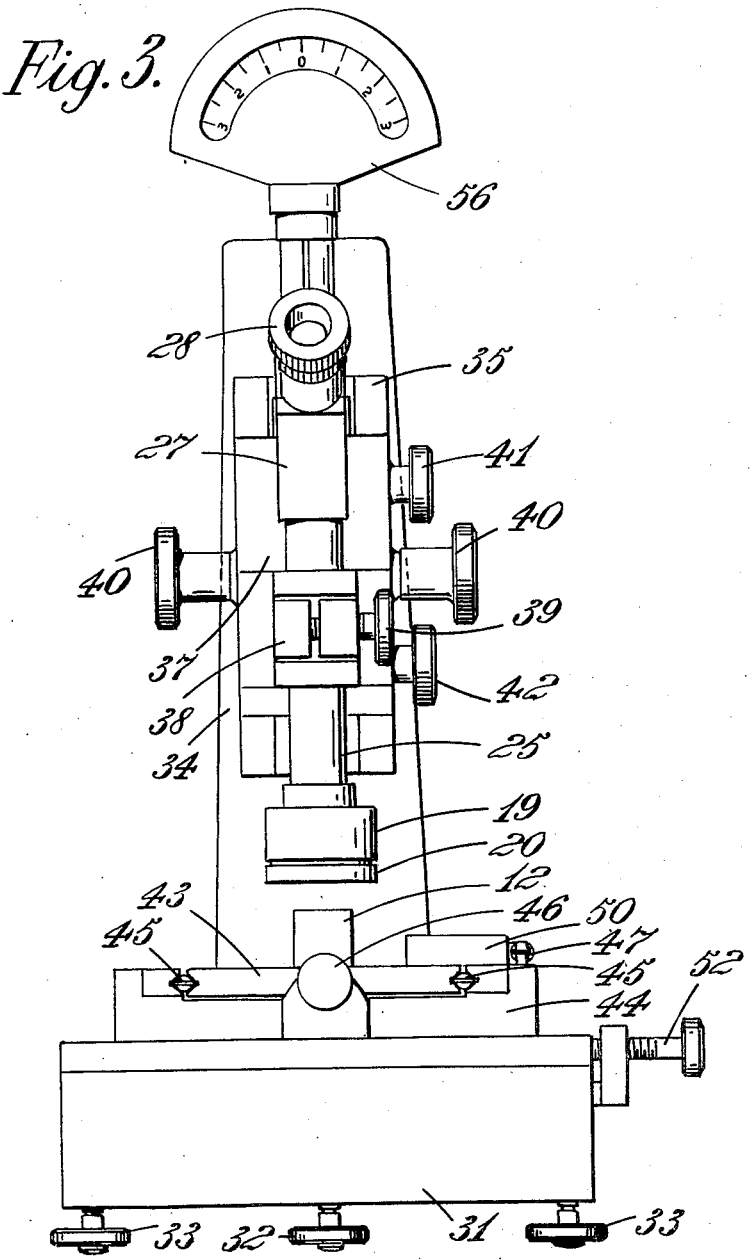
FIGURE 3 is a front elevation of the same.

The apparatus shown in FIGURES 1 to 3 comprises an objective 11, FIGURE 1, consisting of a thick concavo-convex lens which is set with its concave side toward the work 12 to be viewed. The lens 11 is silvered around the margin of its rear face at 13 and also in the centre of its front face 14. In front of the lens 11 is a meniscus lens 15 the purpose of which is to ensure that the light enters from the object 12 substantially at right angles to the lens surface.

Light from the object 12 passes through the front face of the lens 11 around the silvered portion 14 and is reflected back on to the silvered portion 14 from the silvered back margin 13 of the objective and thence out along the two lines 16, 17 through the back of the lens. If only two separated portions of the lens 11 are silvered the light proceeding along the lines 16 and 17 would form two distinct beams without further filtering, but if the whole periphery of the lens is silvered a screen having two apertures for the two beams must be placed behind the objective. For example it could be painted on the back of the small lens 18 which is placed in contact with the back of the lens 11 to ensure that the light beams issue at right angles to the surface of the objective.

The lens 11 is secured in a mounting 19 by means of a screwed ring 20 and in the back of the mounting 19, in the path of the beams 16, 17, there is a prism 21 having front and rear faces which are at right angles to the beams 16, 17 and inclined faces 22, 23 at each end, one in the path of the beam 16 and the other in the path of the beam 17. In front of the inclined face 23, which is in the path of the beam 17, there is a small triangular prism 24 and the effect is that the beam 16 is reflected by the face 22 across and into the path of the beam 17 on which it is superposed.

The fitting 19 which carries the objective 11 is secured on the end of a microscope tube 25 which carries an inclined extension 27 on which is an eyepiece 28. Behind the prism 21 the light passes through a collimating lens 26 carried in the tube 25 and thence through a reflecting prism 29 in the extension 27 into the eyepiece. The eyepiece is fitted with a focusing thread 30.

It can be shown that if the prism faces 22, 23 are parallel and the lens 26 behind the objective is of a suitable focal length, then when the images of the two light beams are focused the two images will coincide and will appear as one to the observer, but if the lens 11 is a little out of focus there will be two images. The point at which the images coincide can be determined with greater accuracy than the point at which exact focus is obtained and indeed by this means, using an objective with a numerical aperture of 0.5, the faces of the workpiece can be located to an accuracy of less than one 10-thousandth of an inch.

The expression for the front focal range of an ordinary microscope is approximately as follows:

$$F.F.R. = \frac{\lambda}{(N.A.)^2} + \frac{fe^2}{VM^2}$$

where $\lambda$=wavelength of light employed, usually 0.000022″.
$fe$=focal length of the eyepiece used to view the image.
$M$=magnification of the objective.
$V$=minimum distance of eyepiece image from eyepiece.
$N.A.$=numerical aperture of objective.

It will be seen that this expression comprises two terms of which the second depends upon the eyepiece employed. Apparatus according to the present invention eliminates the second term and reduces the first term to about half, thereby increasing the accuracy very substantially.

It can be shown that whether the two faces of the prism 21 employed for reflecting the first beam of light 16 from the objective are parallel with one another or whether they are at a slight angle, the images of the two may be made to coincide, which is an important point because the prism is naturally of a small size, not greater in length than the original separation of the two beams.

The optical unit shown in FIGURE 1 is mounted in a stand shown in FIGURES 2 and 3 which comprises a base 31 mounted on levelling screws 32, 33 and having at the back a standard 34 which supports a slide 35 and rack 36 for operating a carriage 37. The tube 25 of the optical system is secured in a clamp 38 on the carriage by means of a clamping screw 39. The carriage can be raised or lowered by means of coarse adjustment knobs 40 working on the rack 36 with a fine adjustment knob 41 and a clamping knob 42.

The work 12 is moutned on a table comprising a top slide 43 to receive the work, mounted in the main body 44 of the table by means of ball runners 45 and adjustable in position by means of a screw 46 which bears against one end of the slide 43. The slide is drawn towards the screw by a spring 47 which at one end is secured to a post 48 on the table 44 and at the other end to a peg 49 on a bracket 50 carried on the slide 43.

The table 44 is similarly carried on ball-race runners 51 and is operated by a screw 52 which bears on one end of the table slide and towards which the table is drawn by a spring 53, seen endwise in FIGURE 2, attached between two posts 54, one projecting vertically from the base 31 and the other projecting horizontally from the side of the table 44. Thus, the work 12 can be adjusted to a desired position beneath the objective 11 in the casing 19.

As the object is to read the relative heights of the upwardly facing portions of the workpiece 12, it is necessary to have some datum from which to measure, and the upper end of the column 34 carries a bracket 55 in which is clamped a dial indicator 56 from which a slidable feeler 57 projects downwardly. The carriage 37 has an upwardly projecting anvil 58 in line with the feeler 57 and against which the anvil 58 normally bears.

In use, the workpiece 12 being placed below the objective 11 on the table 44, the carriage 37 is operated to bring the upper surface of the workpiece 12 into focus. Preliminary adjustments to cause approximate focus with the parts 57, 58 in contact with one another can be effected so as to ensure that the dial indicator 56 gives a reading exactly at the centre of its scale when a workpiece 12 is of normal dimensions. Thereafter variations in the dimensions of workpieces can be ascertained by substituting the new workpieces one after another on the table and noting deviations from normal size as revealed by the dial indicator when the apparatus is focused upon each workpiece in turn.

While the invention has been described in connection with its uses as an optical depth-locator, it can be also used to accurately collimate telescopes and collimators or it can be incorporated in a focal length measuring device.

Figure 4:
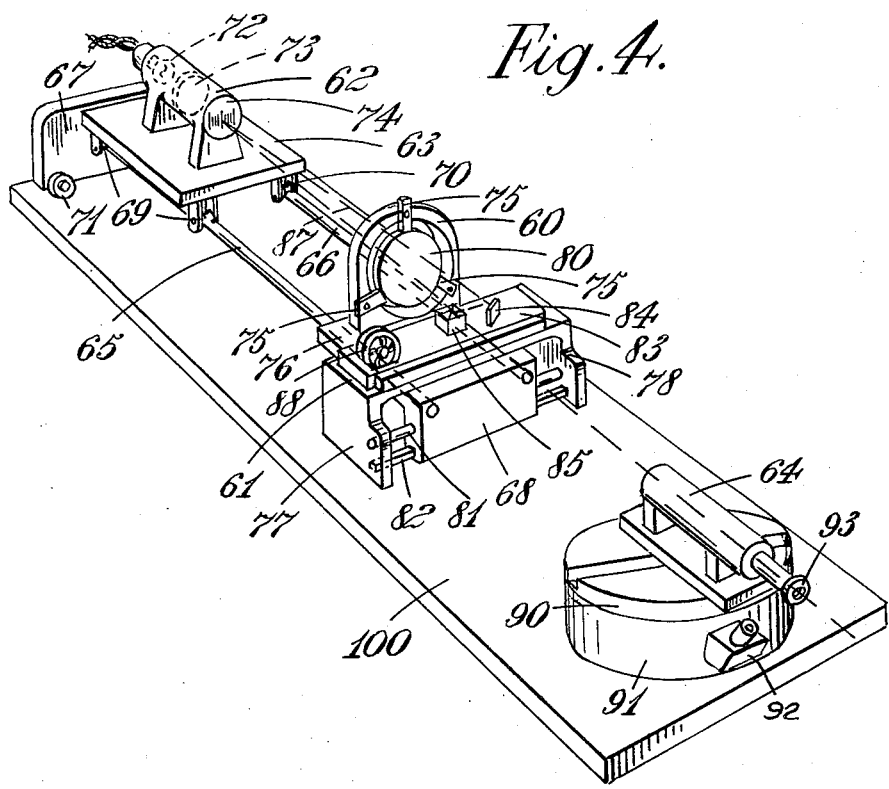
FIGURE 4 is a perspective view of an apparatus for determining the focal length of, or for collimating lenses.

Referring now to FIGURE 4, an apparatus is provided comprising a lens-holding device 60 mounted on a carrier 61, a scale-holder 62 mounted on a longitudinal slide 63 and a goniometer 64 aligned with the lens-holding device 60 and the scale-holder 62.

The slide 63 is mounted on longitudinal guide-rods 65, 66 which are held in parallelism by end castings 67, 68. The slide 63 runs on grooved rollers 69 at one side which fit the guide-rod 65 and on horizontal rollers 70 at the other side which run on the guide-rod 66. The carrier 61 is fixed to a base 100. The scale-holder 62 is a cylindrical casing which contains a lamp 72, a condenser 73 and on its nearer end, as viewed in the drawing, a scale 74 on a translucent graticule.

The lens-holder 60 consists of a frame having a circular aperture and adjustable fittings 75 for gripping a lens 80 which is to be tested. The frame 60 is secured on a horizontal portion 76 of the carrier 61 which spans the end casting 68 without touching it and has downwardly-depending side plates 77, 78 between which there extend a round guide bar 81 and a square bearing bar 82. The bars 81, 82 are parallel to one another and the round bar 81 fits a hole extending through the end casting 68 at right angles to the guide-ways 65, 66. The bearing bar 82 passes through a slot in the bottom of the casting 68 and one face of it bears on the side of the slot. At the other end of the longitudinal guide-ways 65, 66, the end casting 67 rests on rollers 71 which are able to run transversely on the base of the apparatus and thus the longitudinal guide-ways, with the lens-holder 60 and the scale-holder 62, can be moved transversely to the line of sight.

On the carrier 61 there is a cross-slide 83 which carries a mirror 84 set at an angle of about 45 degrees to the optical axis of the system and a double prism 85 with a half-silvered interface between the two halves of the prism. The goniometer 64, is mounted on an optical dividing circle 90 supported on a base 91 and capable of rotation in a horizontal plane. The axis of rotation of the table 90 coincides with the optical centre of the front lens of the goniometer 64 and the angular setting of the goniometer can be determined by reading the dividing table through a magnifying microscope 92. The goniometer has an eyepiece 93.

The mirror 84 and the prism 85 are adjustable relatively to one another on the cross-slide 83 and they are set for the purpose of a test so that their centres are approximately separated by a distance equal to two-thirds of the aperture of the lens 80 which is to be tested and so that they are symmetrically disposed relatively to the lens. They are aligned so that two parallel beams of light from the lens, incident respectively on the mirror and the prism are united as one parallel beam on emission from the prism. The mirror 84 is adjusted by tilting it about a vertical axis till this occurs. (This adjustment is made before any test is taken. It can be effected by placing a mirror behind the assembly of prism 85 and mirror 84 and directing light on to the assembly from an auto collimator so that it is reflected back by the mirror which has been placed behind the assembly. The mirror 84 is then adjusted until the two images received by the auto collimator coincide.) The scale 74 is now moved by adjusting the slide 63 along the guide-ways 65, 66 to the approximate position of the focal plane of the lens 80. On looking in the eyepiece of the goniometer, in general two images of the scale 74 will be seen, one derived by direct vision through the half-silvered prism 85 and the other by reflection from the mirror 84 and the half-silvered inclined face of the prism 85, as indicated by chain line 87. If the carriage carrying the scale 74 is now adjusted along the guide-ways a position can be found where the two images are superposed and this is the exact position of the focal plane of the lens 80. Having adjusted the scale 74 into this focal plane, the sub-slide 83 is moved across the line of vision until an iris diaphragm 88 carried on the slide 83 is brought into the position formerly taken by the prism 85. The test lens L and the scale S are now adjusted transversely to the line of sight until the lens axis is coincident with the axis of the goniometer 64 and the goniometer is used to measure the angle between two of the lines of the scale which are symmetrically disposed with respect to the optical axis of the lens 80. If S represents the distance apart of the lines on the scale and $\theta$ is half the angle between the lines, the focal length of the lens is given by the formula $$F = \frac{S}{2 \tan \theta}$$

It will be noted that the optical disposition of the parts for the determination of the focal length of the lens is similar to the optical disposition of the parts in FIGURES 1 to 3 for the determination of the distance of the surface of the part 12 from the microscope, the test lens 80 taking the place of the microscope objective.

I claim:

1. An optical gauging apparatus comprising in combination a stand for supporting an object, an optical system having an axis and mounted for sliding movement as a whole unit relatively to the stand along the direction of said axis and means for measuring to within fine limits the relative movement of the optical system and stand, said axis passing through the object and said optical system unit comprising an objective of wide aperture and short focal length located nearest the object, a reflector system behind the objective including two separated reflectors fixed in relation to each other and located to pick up two distinct light beams from separated parts of the objective to bring them together and to reflect said beams toward an eyepiece so that when the optical system is a particular distance from the object and the object is in focus, two images formed by said beams are superposed, an eyepiece for examining said images and a mounting to hold the objective, mirror system and eyepiece in fixed relation to each other.

2. A device as claimed in claim 1, wherein the separated reflectors for picking up the two distinct beams comprise a mirror to pick up the first of said beams and reflect it transversely to the optical axis and, spaced from the mirror in the direction in which said first beam is reflected a prism with a half-silvered face to catch and reflect said first beam and also to pass on the second of said two beams received from the lens, in superposed relation to the first beam.

3. An optical depth-locating device as claimed in claim 1, wherein the reflecting means comprise a prism extending across from one of said two beams to the other and having an inclined internal face in the path of one of said beams, a second parallel or nearly parallel face in the path of the second of said beams and means to cause said second beam to pass through the second face while the first beam is reflected thereby.

4. An optical depth-locating device as claimed in claim 1, wherein the objective comprises a thick concavo-convex lens set with its concave side toward the object to be viewed and silvered at its rear edges and its front centre.

5. A gauging apparatus as claimed in claim 1 wherein between the reflectors and the objective is a screen for cutting out other light than that of the beams picked up by the reflectors.

6. An optical depth-locating device as claimed in claim 1, in which means are provided to adjust the focal setting of said mounting toward and away from the object and means to indicate the position of the focal setting, and wherein the means to indicate the position of the focal setting comprises a feeler adapted to make contact with a portion of the mounting for the optical system, which feeler is connected to a multiplying indicator for displaying its location.

7. Apparatus as claimed in claim 1 wherein the mounting for holding the objective and other parts of the optical system is such as to be capable of holding as objectives lenses to be tested so that the apparatus can be employed for measuring the focal length of the lenses.

References Cited in the file of this patent

UNITED STATES PATENTS

| 1,451,302 | Mihalyi | Apr. 10, 1923 |
| 2,312,261 | Mills | Feb. 23, 1943 |
| 2,336,330 | Wittel | Dec. 7, 1943 |
| 2,505,983 | Mills | May 2, 1950 |
| 2,785,604 | Blaisse et al. | Mar. 19, 1957 |

FOREIGN PATENTS

| 509,424 | Great Britain | July 14, 1939 |
| 899,112 | Germany | Dec. 7, 1953 |